(No Model.)
G. VAN DER HŸLEN.
WATER COOLER AND FILTER.
No. 384,801. Patented June 19, 1888.
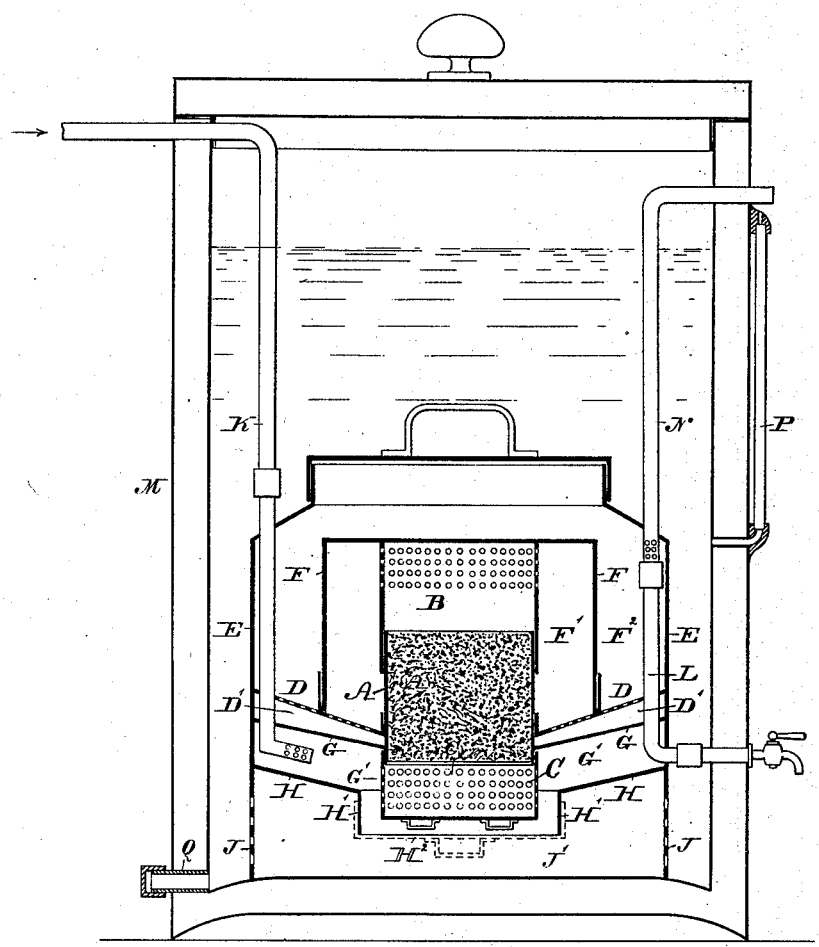
WITNESSES:
Th. Rolle
A. P. Grant
INVENTOR:
Georges Vander Hÿlen
BY John A. Biedersheim
ATTORNEY.

UNITED STATES PATENT OFFICE.

GOERGES VAN DER HŸLEN, OF PHILADELPHIA, PENNSYLVANIA, ASSIGNOR OF ONE-HALF TO HENRY F. LEE, OF SAME PLACE.

WATER COOLER AND FILTER.

SPECIFICATION forming part of Letters Patent No. 384,801, dated June 19, 1888.

Application filed January 13, 1887. Renewed February 8, 1888. Serial No. 263,359. (No model.)

*To all whom it may concern:*

Be it known that I, GOERGES VAN DER HŸ-LEN, a citizen of Finland, having resided one year last past in the United States and made oath of intention to become a citizen thereof, a resident of the city and county of Philadelphia, State of Pennsylvania, have invented a new and useful Improvement in Water Coolers and Filters, which improvement is fully set forth in the following specification and accompanying drawing, in which the figure represents a vertical section of a filter embodying my invention.

The object of my invention is to provide a filter which is effective in action and may be used with or without a cooler, as will be hereinafter set forth.

Referring to the drawing, A represents a cylinder, to the upper and lower ends of which are secured, respectively, the caps B C, which communicate with said cylinder A, the sides of said caps B C being perforated, and the top and bottom of the same, respectively, are closed.

D represents a perforated diaphragm, which is secured to the outer casing, E, of the filter.

The cylinder A passes tightly through the center of said diaphragm D, and is surrounded by a cylinder, F, which is closed at top and open at bottom, forming the chambers F' $F^2$, it being noticed that said cylinder F is located between the cylinder A and cap B and the outer casing, E, and has its lower edge resting on the diaphragm D.

G represents an imperforate diaphragm, which is secured to the casing E and located below the diaphragm D, the cylinder A passing tightly through said diaphragm G.

H represents an annulus or partition, which is secured to the outer casing, E, and has its central opening below the cap C, the wall of said opening having a downwardly-projecting flange, H', to which a removable cap, $H^2$, may be fitted when so desired, said cap being shown in dotted lines.

The diaphragms D G form the chamber D', and the diaphragm G and annulus H form the chamber G', the latter surrounding the perforated cap C.

The casing E is extended below the annulus H, forming the rim J, which is perforated, and leaves the chamber J' below said annulus, said chamber being in communication with the filter through the perforations of said rim.

K represents a supply-pipe, which enters the chamber G', and may be connected with a hydrant or other place of supply, said pipe passing through the wall of the cooler M, within which the filter is located, the rim J resting on the bottom of the cooler.

L represents the outlet or discharge pipe for the filtered water or fluid, the same extending from the chamber $F^2$ through the casing E and the wall of the cooler M, when the latter is used. Connected with the upper end of said pipe L is an air-pipe, N, which opens from the atmosphere into the chamber $F^2$.

P represents a gage connected with the cooler for indicating the height or extent of water therein.

Water is admitted through the pipe K into the chamber G', and escapes through the flange H' and rim J into the cooler, the latter being supplied to the required height. The water now enters the cap C and rises therefrom through the cylinder A and cap B, and escapes from the latter into the chamber F', and thence through the perforated diaphragm D into the chamber D', and again through said diaphragm into the chamber $F^2$. All or some of said parts may be filled with filtering material—such as sponge, gravel, charcoal, quartz, &c.—whereby the water or fluid is properly filtered.

The filtered water enters the pipe L, and is thereby conveyed to the place of service, the end of said pipe having a faucet or cock, for evident purposes.

Sediment settles at the bottom of the cooler, and may be removed therefrom through the pipe Q of the cooler, it being noticed that dirt collected in the cap C, cylinder A, and cap B may escape through the perforations of said cap through the flange H' into the bottom of the cooler.

When the filter is removed from the cooler, it is serviceable by fitting the cap $H^2$ to the flange H', so as to close the central opening of the annulus H. In this case the water from the pipe K fills the chamber G', and then enters the cap C, the subsequent course of the same being similar to that hereinbefore stated. The pipes K and N are shortened, the pipe N, however, being sufficiently long so as not to permit the overflow of water through the same.

The service-pipe of a hydrant or other source of supply may be connected with the pipe L, so as to reverse the course of water through the filter for agitating and refreshing the filtering material and removal of impurities, the escape of the water being through the pipe K.

The casing has a cap at its top for access to the interior thereof.

The parts are either described or shown as cylindrical; but to this shape I do not limit myself.

Having thus described my invention, what I claim as new, and desire to secure by Letters Patent, is—

1. The cylinder A, with perforated ends or caps, the diaphragm G, and the annulus H, having an opening below the cylinder A and formed with a flange, H', said parts being combined and operating substantially as described.

2. The cylinder A, the diaphragm G, and the annulus H, with an opening below said cylinder and a flange, H', in combination with the outer casing, E, having a perforated rim at bottom, substantially as described.

3. A filter, substantially as described, having an inlet-pipe, K, an outlet-pipe, L, and air-pipe N, in combination with a cooler, said filter having a perforated rim, J, which forms a communication between the filter and cooler, substantially as described.

4. The outer casing, E, with an annulus or partition, H, at bottom, and diaphragms G D above the same, forming the chambers G' D', the central cylinder, A, with perforated caps, and the surrounding cylinder F, forming the chambers F' F², said parts being combined and operating substantially as described.

5. A filter consisting of the casing E, with a closed diaphragm, G, perforated diaphragm D, and closed diaphragm H, with flange H' secured thereto and forming chambers G' F' F², the cylinder A, with perforated caps B C, the cylinder F, supported on the diaphragm D, the inlet-pipe K, leading to chamber G', and outlet-pipe L, leading from chamber F², the said casing having caps at top and bottom, all of said parts being arranged and combined substantially as described.

6. A cooler, in combination with a filter inclosed within said cooler, an inlet-pipe leading through said cooler into said filter, an outlet-pipe leading from said filter to outside said cooler, and having an air-pipe connected therewith at its inner end, said filter having the perforated rim J, whereby water-communication is had from said filter to said inclosing-cooler, substantially as described.

GOERGES VAN DER HŸLEN.

Witnesses:
JOHN A. WIEDERSHEIM,
A. P. GRANT.